Patented Feb. 26, 1929.

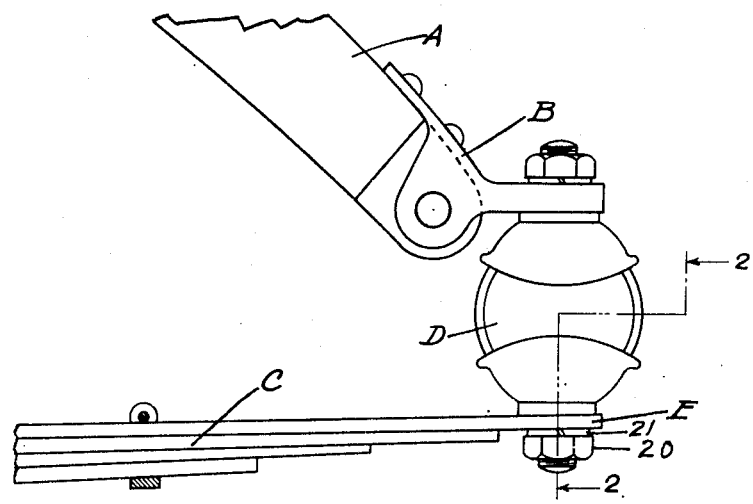
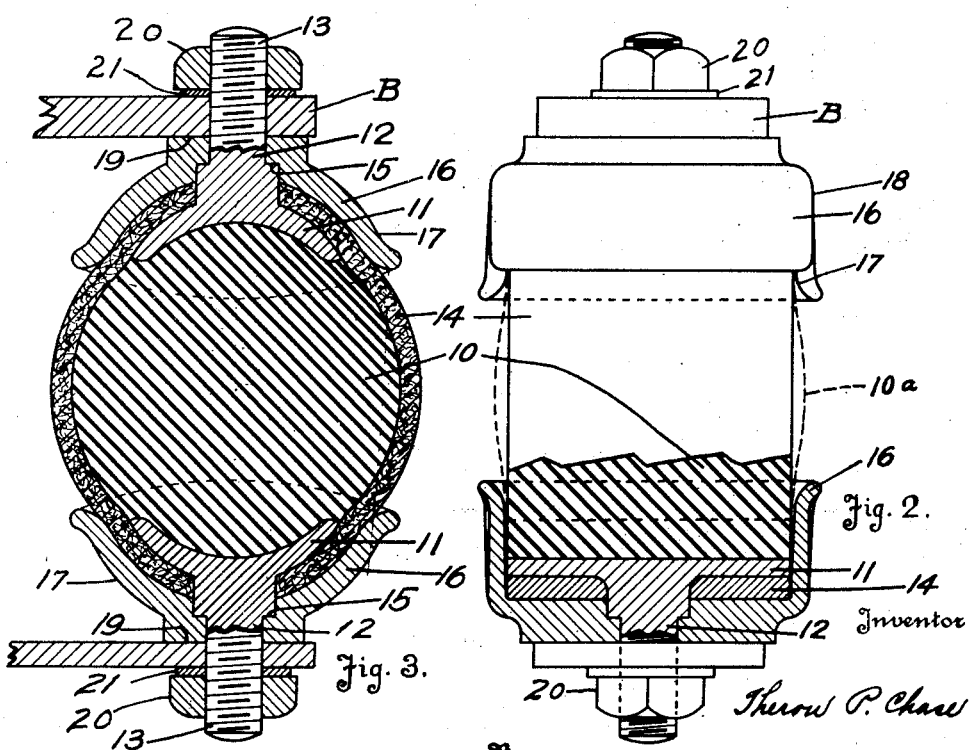

1,703,297

UNITED STATES PATENT OFFICE.

THERON P. CHASE, OF DAYTON, OHIO, ASSIGNOR TO GENERAL MOTORS RESEARCH CORPORATION, OF DAYTON, OHIO, A CORPORATION OF DELAWARE.

RESILIENT CONNECTER.

Application filed January 7, 1925. Serial No. 1,118.

This invention relates to resilient connecters adapted to be used as spring shackles on vehicles, or in any place where two members having a limited relative movement with respect to each other are desired to be united by an interposed shock absorbing connecter which will not rattle and needs no oiling.

The connecter hereinafter described and claimed is an improvement over that which is described and claimed in the application of T. P. Chase, Serial No. 702,951, filed March 29, 1924.

The improvement consists principally in the means for uniting to the elastic elements of the connecter the attaching elements by which the connecter may be secured to external members, such as a spring and a frame bracket.

In the accompanying drawings, in which like reference characters indicate like parts throughout the several views Fig. 1 is a side elevation of a structure in which the improved connecter is used as a spring shackle;

Fig. 2 is an end elevation partly in section, taken on the line 2—2 of Fig. 1;

Fig. 3 is a side elevation of the connecter, partly in section;

Figure 5:
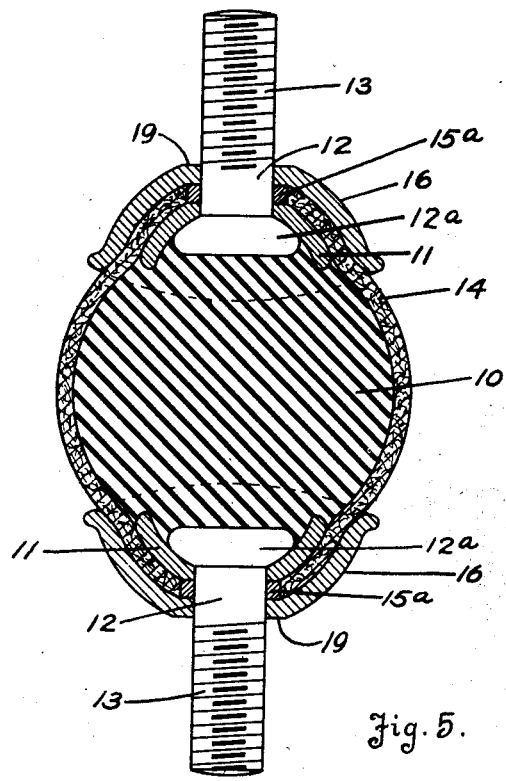
Fig. 5 is a section similar to that of Fig. 3, showing a slight modification.
Figure 4:
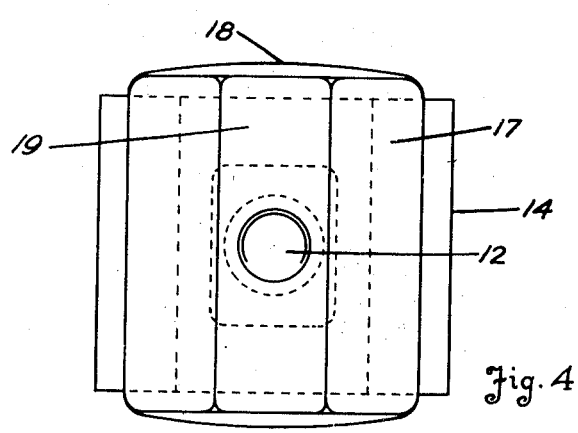
Fig. 4 is a plan view thereof.

In order to illustrate one useful application of a connecter made in accordance with this invention, Fig. 1 shows a fragment of a frame sill A, having a bracket B; a portion of leaf spring C; and a connecter D, secured between the bracket B and one end of the long leaf E of the spring.

Referring more particularly to Figs. 2 and 3, 10 indicates an elastic mass of rubber or other suitable material susceptible of being vulcanized. The mass 10 is of substantially cylindrical form, circular in cross section. Plates 11, preferably curved in a plane perpendicular to the axis of the elastic mass, as shown, are fitted against the mass 10 on opposite sides thereof. The plates 11, as illustrated, are provided with shanks 12, disposed centrally of the plates. The end portions of these shanks are threaded, as indicated at 13, for the reception of clamping nuts. Surrounding and confining the elastic mass 10 is a flexible inelastic and relatively non-stretchable band 14. This band 14 may be any suitable flexible inelastic material, such as multiply fabric, or several layers of fabric, but is preferably made of cord or cord fabric wound around or encompassing the mass 10. In case the layer 14 is made of cord fabric the warp yarns should extend circumferentially. This flexible band 14 should be of sufficient strength to, of itself, sustain the strains that the connecter may be subjected to, so that the fabric would not allow the connected internal parts to separate even if the elastic mass were removed. The end portions of the mass 10 need not be covered by any fabric and, in any event, should not be confined so as to prevent the distortion of the elastic mass 10 in an axial direction. The shanks 12 before described pass through openings in the band 14 at diametrically opposite points. As shown in Figs. 2 and 3, there is a shoulder 15 on each shank which is slightly larger than the shank 12 and it is this shoulder which penetrates the band 14. External clamping plates 16 confine the band 14 between their inner surfaces and the exterior surfaces of the internal plates 11. External plates 16 are in the form of cup-like bodies having curved sides 17 and relatively flat end walls 18. The walls 18 may flare slightly outward as shown in Fig. 2 and the edges of both curved sides 17 and end walls 18 are rounded to avoid cutting of the flexible band or the elastic material. The shoulder 15 may be countersunk into the inner face of the external clamping plate 16 and said clamping plate 16 has preferably a flattened area 19 on its outer surface in order that the springs, brackets or other members which the connecter is designed to unite may have a firm engagement. After the shanks 12 have been passed through the holes in the bracket B and leaf spring E, for example, the said bracket and spring may be securely clamped to the connecter and locked in place by means of the nuts 20 and lock washers 21.

Although the shank 12 is shown in this embodiment formed integrally with the internal plate 11, it will be observed that the shank may be made separate from the plate and attached to it in any desired manner as by a head 12ª engaging the inner surface of said plate 11, as shown in Fig. 5. The shoulder 15 may be replaced by washer 15ª.

As the mass of elastic material is in the form of a cylinder of circular cross section, modified only sufficient to accommodate the clamp 11, it will be apparent that when it is compressed or otherwise distorted it must bulge longitudinally of its axis between the edges of the end walls 18 of the external clamping plates; and the flexible band 14 will cling even more closely to the elastic material since, if the circular cylinder is deformed, to any extent, its perimeter is no longer circumferentially than it was before, while the volume capable of being circumscribed by it is less. This necessitates the deformation of the elastic interior mass endwise, as indicated by dotted lines at 10ª. With the construction shown, there can be no tendency of the flexible band to separate from the elastic interior during deformation of the elastic mass.

Preferably elastic mass 10 should be of the best grade of rubber, having superior strength and elasticity. The band 14 may be made of cord fabric or cords impregnated with rubber. The internal clamp plates 11 are assembled in position with shanks 12 inserted through openings in the band. A mass 10 of rubber, or the like may be inserted within or otherwise assembled with the band and the whole assembly heated under pressure in a mold until the mass is cured and vulcanized in the form shown.

What is claimed and desired to be secured by Letters Patent is as follows:

1. A resilient connecter comprising a mass of elastic vulcanizable material circular in cross section surrounded by a strengthening band of relatively inelastic non-stretchable flexible material; a device for securing the connecter to an external member consisting of an internal plate within the band of flexible material, and an element connected with the plate and protruding through the band which may be secured to said external member.

2. A device of the kind defined in claim 1 in which the device for securing the connecter to an external member is an internal plate and the element connected to the internal plate is a threaded shank that extends through the band.

3. A device of the kind defined in claim 1 in which the internal plate lies against the inner surface of the band between it and the elastic material.

4. A device of the kind defined in claim 1 in which the internal plate lies against the inner surface of the band between it and the elastic material and an external plate is arranged to clamp the band between it and the internal plate.

5. A device of the kind defined in claim 1 in which the internal plate is curved and lies against the inner surface of the band between it and the elastic material, and an external plate correspondingly curved is arranged to clamp the band between it and the internal plate.

6. A resilient connecter comprising a cylindrical mass of elastic vulcanizable material of approximately circular cross section, oppositely disposed internal plates curved approximately to the contour of the elastic mass and fitting its exterior, a band of relatively inelastic non-stretchable flexible material surrounding the elastic mass and said plates and an element connected with each plate protruding through the band for securing the connecter to external members.

7. A device of the kind defined in claim 6 in which external clamping plates confine the flexible band between them and said plates that fit the exterior of the elastic mass.

8. A device of the kind defined in claim 6 in which external clamping plates confine the flexible band between them and said plates that fit the exterior of the elastic mass, said external clamping plates having a cup-like form providing end walls for limiting the expansion of the elastic mass not covered by the flexible band to the portions exposed between the end walls of the opposite external clamping means.

9. A device of the kind defined in claim 1 in which an external clamping plate confines the flexible band between itself and the internal plate, said external clamping plate having a cup-like form providing end walls for limiting the expansion of the elastic mass to those portions of the end walls not covered by the end walls of the external clamping means.

10. A deformable support comprising a cylinder of elastic material, a non-stretching cylindrical band therearound permitting deformation at the exposed ends only, securing means comprising a curved plate and a shank, the plate positioned between the incompressible mass and the surrounding band, and the attaching shank extending through the non-stretching band.

11. A deformable support comprising a body including an elastic cylindrical mass capable of deformation at its ends only, and attaching means engaging the curved walls of said cylindrical mass and provided with means for fastening an external member thereto.

12. A deformable connecter comprising a mass of elastic material having a part circular in cross section and a band of non-stretching inelastic material surrounding said part whereby no deformation may occur within the region bounded by said band.

13. A deformable connecter comprising a mass of elastic material cylindrical in form, and a band of non-stretching inelastic material surrounding the cylindrical surface of said connecter whereby deformation may occur at the ends only of said connecter.

14. The invention defined by claim 13, together with supporting and supported members engaging diametrically opposite parts of said cylindrical surface.

In testimony whereof I hereto affix my signature.

THERON P. CHASE.